United States Patent [19]

Hermann

[11] 4,058,080

[45] Nov. 15, 1977

[54] ENGLISH-METRIC DIAL ASSEMBLY

[75] Inventor: Otto Hermann, Cincinnati, Ohio

[73] Assignee: LeBlond Incorporated, Cincinnati, Ohio

[21] Appl. No.: 687,313

[22] Filed: May 17, 1976

Related U.S. Application Data

[63] Continuation-in-part of Ser. No. 583,418, June 2, 1975, abandoned.

[51] Int. Cl.² ..................... B23Q 17/00; G06C 17/00
[52] U.S. Cl. ........................ 116/115.5; 116/DIG. 47; 235/117 A
[58] Field of Search ............ 116/115.5, 115, DIG. 46, 116/DIG. 47; 74/640; 235/117 A, 103, 119, 122, 116

[56] References Cited

U.S. PATENT DOCUMENTS

| | | | |
|---|---|---|---|
| 1,760,938 | 6/1930 | Edgar | 116/115.5 |
| 2,709,924 | 6/1955 | Castelli | 116/115.5 |
| 3,101,009 | 8/1963 | Musser | 74/640 |
| 3,545,401 | 12/1970 | Davies | 116/115.5 |
| 3,670,579 | 6/1972 | Wilkes | 74/640 |
| 3,820,501 | 6/1974 | Foglein | 116/115.5 |
| 3,952,693 | 4/1976 | Parsons et al. | 116/115.5 |

FOREIGN PATENT DOCUMENTS

| | | | |
|---|---|---|---|
| 117,782 | 12/1943 | United Kingdom | 116/115.5 |
| 1,238,653 | 7/1971 | United Kingdom | 116/115.5 |

*Primary Examiner*—Daniel M. Yasich
*Attorney, Agent, or Firm*—Wood, Herron & Evans

[57] ABSTRACT

A dial assembly adapted to be secured to a lead screw and operative to enable measurements of a machine element effected by the lead screw to be measured in either English or Metric units of measure. The dial assembly includes two different dials interconnected by a gear train, which gear train comprises a spur gear fixed to each dial and a continuous, toothed ring or belt drivingly interconnecting the spur gears.

26 Claims, 9 Drawing Figures

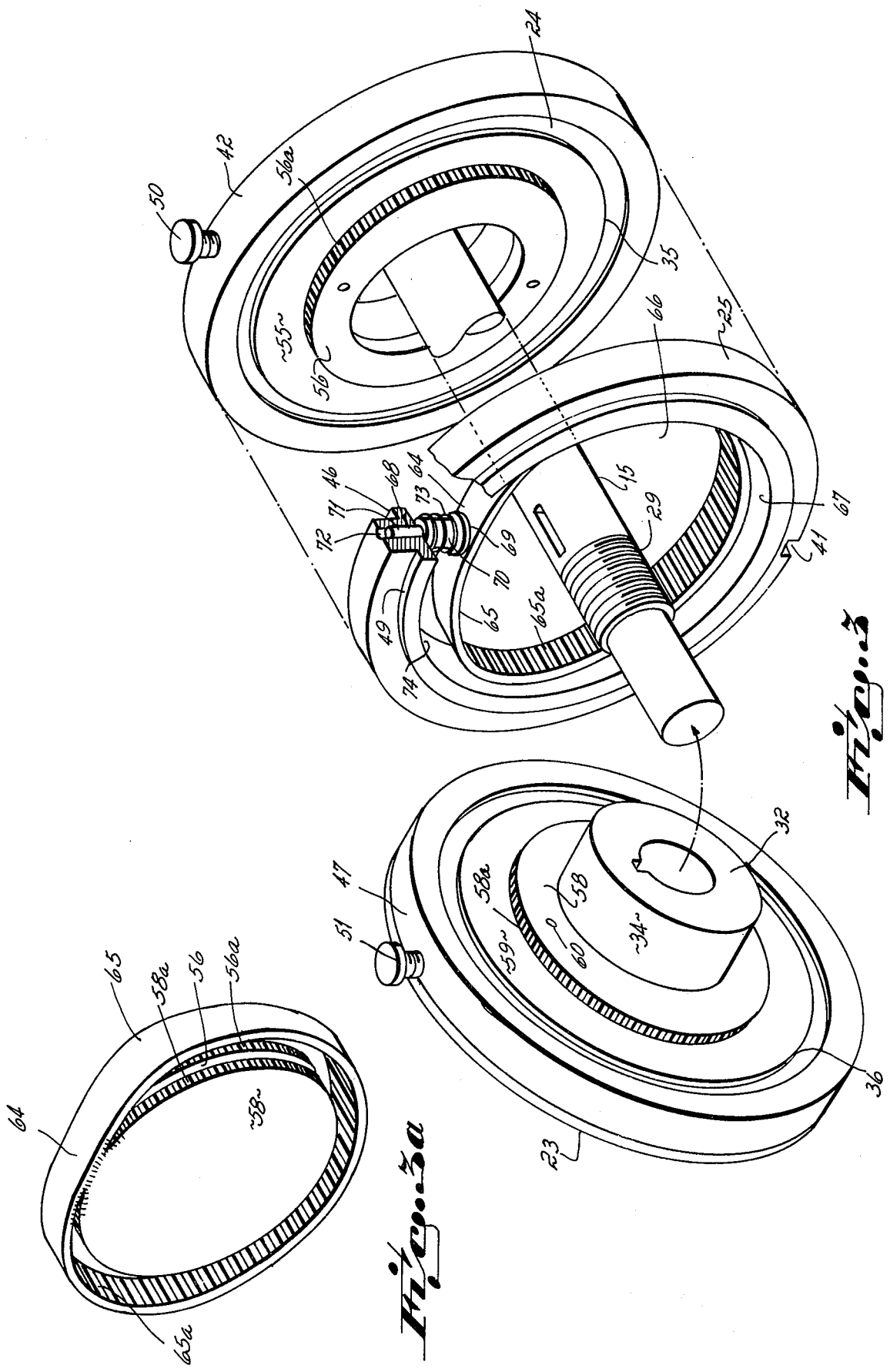

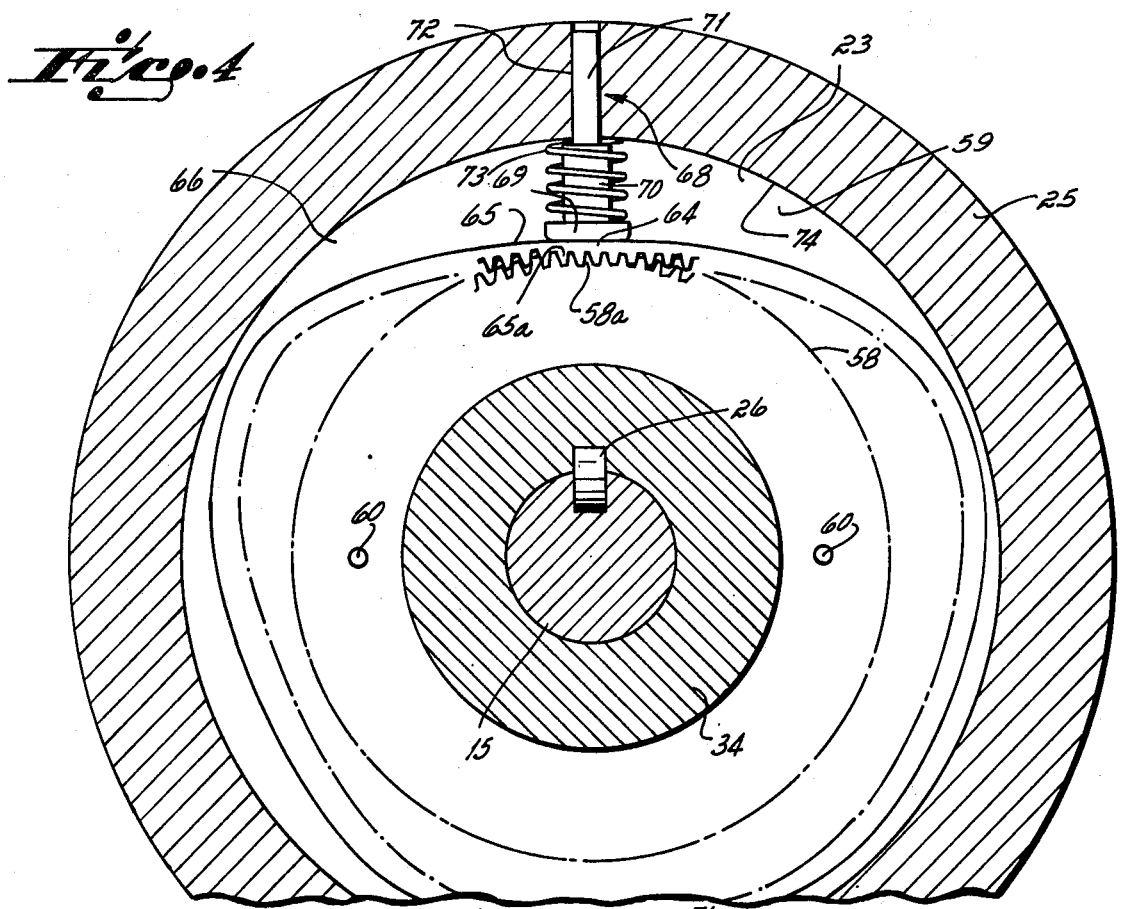
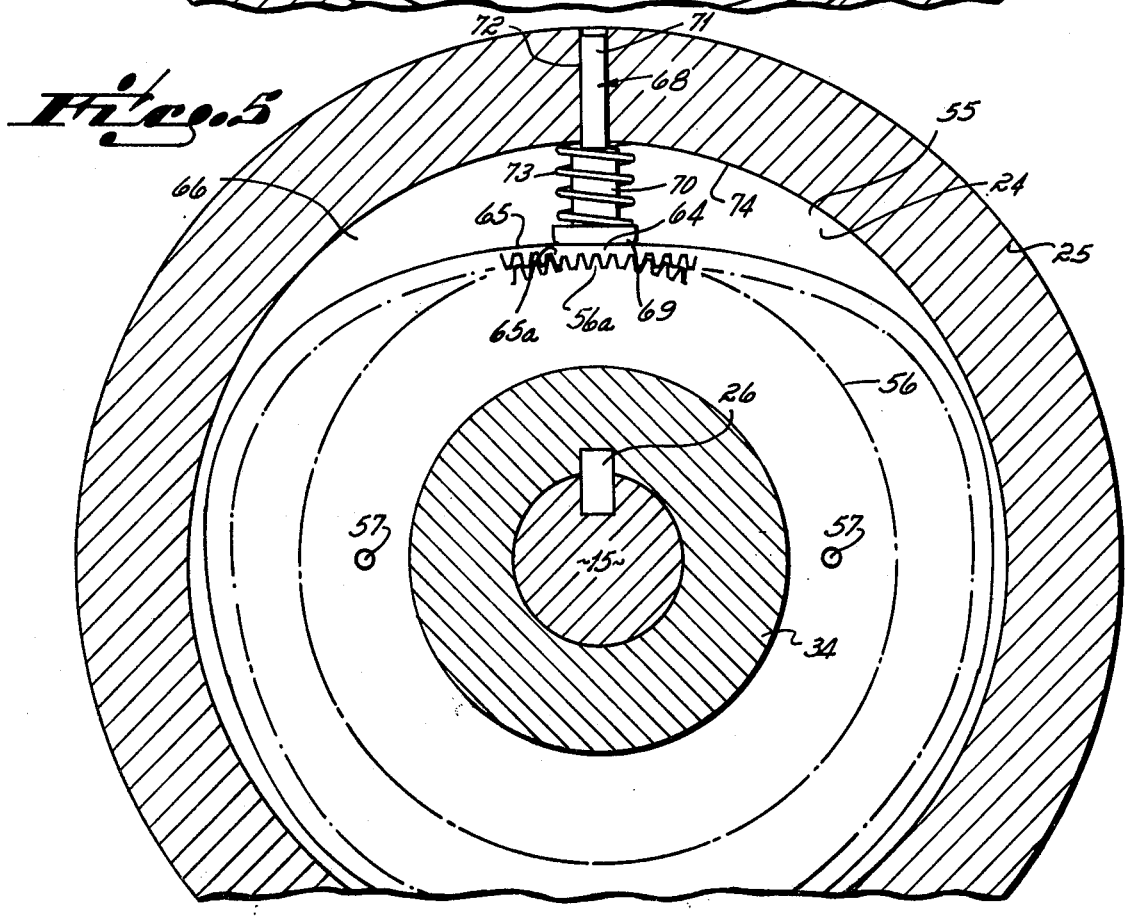

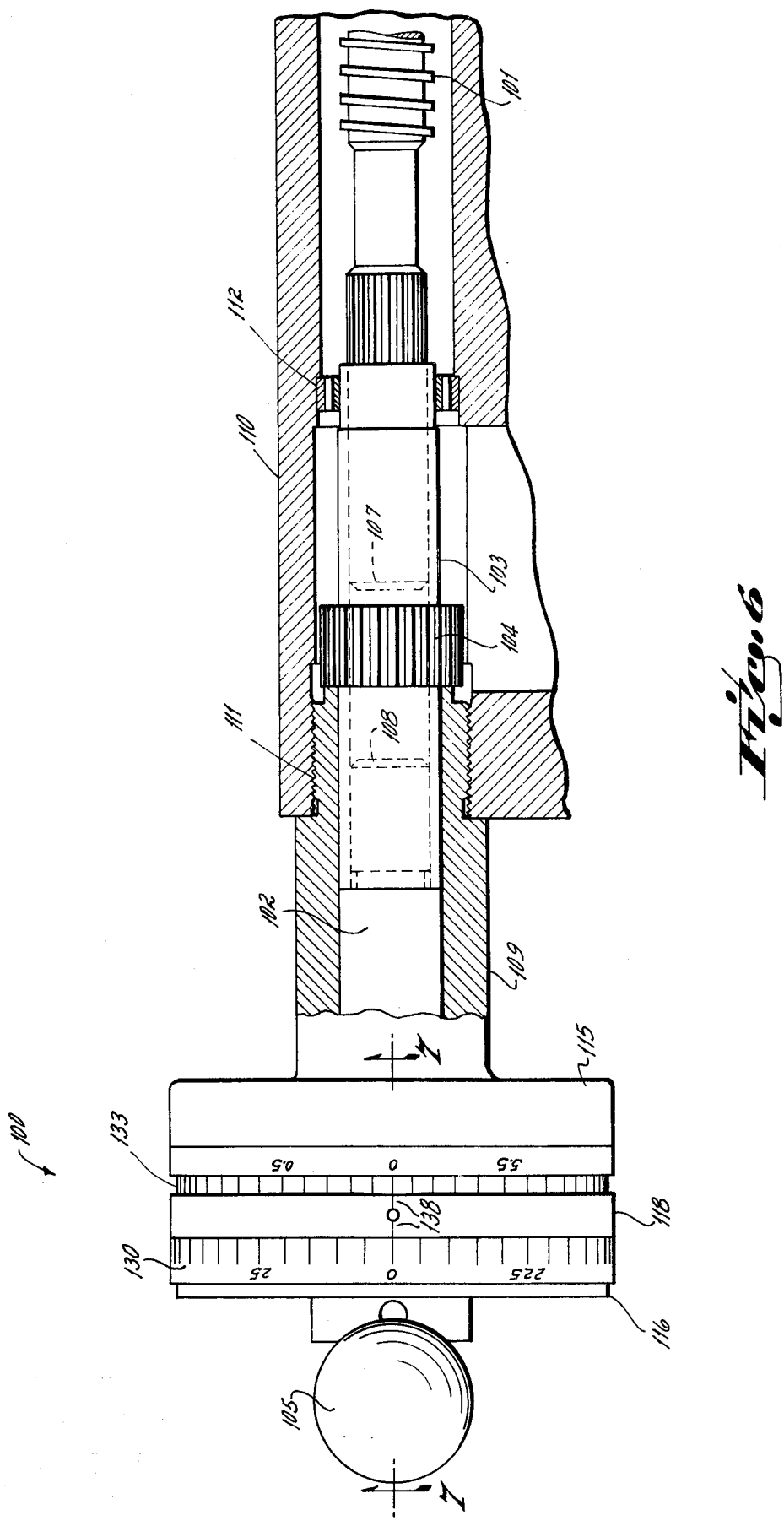

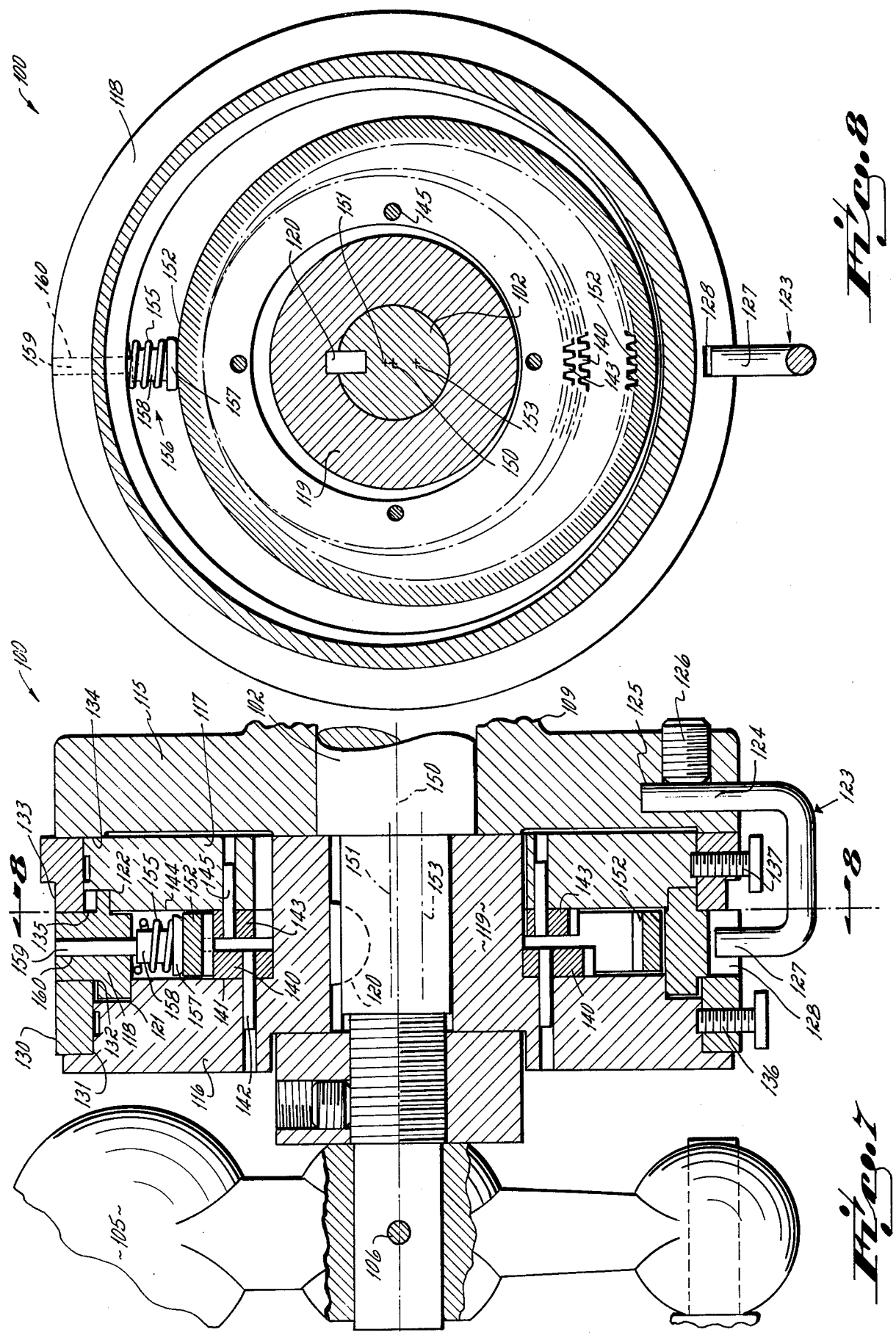

ENGLISH-METRIC DIAL ASSEMBLY

This application is a continuation-in-part of U.S. application Ser. No. 583,418, filed June 2, 1975, assigned to the assignee of this application U.S. application Ser. No. 583,418 was abandoned after filing of this continuation-in-part application.

This invention relates to dial assemblies which enable readings to be taken of the linear travel of a dial connected element on two endless scales having different unit measurements.

There are many instances in the machine tool industry in which a dial is attached to a machine to enable the operator to take readings of linear movement of part of the machine. For example, it is standard practice to attach a dial to a lathe to enable readings to be taken of the amount of travel or feed of a cutting tool. Such a dial may be driven by a handwheel for rotating a feed screw and the calibrations on the dial are determined by the pitch of the feed screw.

In countries which presently utilize the Imperial or English unit of measurement the feed screw pitch is in decimals of an inch and the graduation on the dial will be numbered accordingly. If in such instances it is desired for the operation to be carried out in Metric units some adaptation is necessary to the dial assembly if the same feed screw is to be used. It has been a main objective of this invention to provide an improved dial assembly which enables a machine tool to measure slide movement in either Imperial unit measurements or in Metric unit measurements.

According to the present invention there is provided a dial assembly for enabling visual readings to be taken on either one of two scales of linear movement of a slide. Slide movement is effected by a rotary handwheel adapted for connection to a lead screw or rotary to linear motion translating device to impart linear movement to the slide. The handwheel is drivingly keyed to a scale demarked in the Imperial units of measurement and a second dial demarked in Metric units of measure is drivingly connected to the first dial through appropriate gearing. Both dials are always in driving engagement with the handwheel so that measurements may always be taken on either scale of linear displacement of the driven slide. The gearing ratio of the drives between the two dials is such that both scales are "continuing" for successive revolutions of the handwheel. The term "continuing" as herein used refers to scales which are endless and in which the origin coincides and forms a graduation for a major division some distance along the scales so as to enable all of the divisions of the scales used for the first revolution of the handwheel to be used for subsequent revolutions.

To illustrate the "continuing" nature of both scales one example will be given. In a lathe the cross feed screw pitch is commonly 8 threads per inch, or a 0.125" of linear travel for each revolution of the screw. The Imperial scale dial which is driven directly from the lead screw and attached handwheel, is commonly calibrated into 125 equal divisions, each of which therefore represents a linear movement of the slide of 0.001". One revolution of the handwheel and therefore the Imperial measure dial which is directly driven by the handwheel, represents 0.125" of linear travel of the screw driven slide. If the handwheel is rotated 8 times the slide moves 1" or 25.4 millimeters.

If the Metric measure dial was directly driven by the same handwheel when using the Metric scale, each revolution of the Metric dial would represent a travel of the slide of $\frac{1}{8} \times 25.4$ millimeters or 3.175 millimeters. Calibrating the Metric scale to read 3.175 millimeters per revolution is impractical since this would result in a non-continuing scale when more than one revolution of the handwheel was made. Consequently, to make the Metric scale continuing, it uses a reasonable number of graduations, as for example 300 graduations. The Metric scale dial must therefore rotate faster than the handwheel by the ratio of 3.175/3 or 1.05833/1. Utilizing a gear ratio of 127/120 gives this exact figure.

Thus, in this example, by utilizing a gear ratio of 127/120 between the drive from the Imperial unit measure dial to the Metric measure dial the Metric scale dial may be graduated into 300 equal divisions each representing 0.01 millimeters travel on the slide and the Metric scale will be continuous.

The invention of this application resides in the gearing arrangement between the two dials which enables them both to be continuous to achieve this gear ratio while simultaneously effecting a less costly, smoother acting dial assembly packaged in a smaller housing than has heretofore been possible.

At the present time there are basically two different approaches to obtaining this gear ratio between the dials of an Imperial-Metric dial assembly. One arrangement utilizes internal ring gears attached to the dials and a pair of spur gears drivingly connected between the two dial connected ring gears to effect this gear ratio while maintaining a continuous drive. Such an arrangement is typified by Rabinow U.S. Reissue Pat. No. 26,527 issued Feb. 11, 1969. Another common arrangement employs a spur gear drivingly connected to one dial and interconnected to the other dial by a ring gear. British Pat. No. 1,133,782 typifies this latter type of gear driving arrangement. Both of these styles of drives are subject to criticism in that they both require larger housings and dial assembly packages than is commonly employed on either an English only or a Metric only dial. Consequently, neither type of drive arrangement is suitable for being retrofitted into existing machines so as to give them Imperial-Metric conversion interchangeability. Additionally, both gearing arrangements require very precise expensive gears if the dial assembly is to have a "smooth" feel and both are subject to the inclusion of backlash in the gearing.

Another objection to the previously existing dual dial arrangements is an upper speed limitation imposed by the gearing. If the idler gears are much smaller in diameter than the translating gears, as in the above identified Rabinow U.S. Reissue Pat. No. 26,527, very high traverse or operating speeds are not possible.

It has been a primary objective of this invention to overcome all of these objections with an improved dial assembly which is less expensive to manufacture, which is capable of being fitted into an assembly no larger than is commonly incorporated in Imperial only or Metric only type dial assemblies, and which is smooth acting without appreciable backlash. Because the improved Imperial-Metric dial assembly of this invention fits within a package which need be no larger than a conventional Metric only or Imperial only assembly, it is useful to retrofit existing machines so as to give them Imperial-Metric conversion interchangeability.

All of these objectives are achieved by this invention in a first embodiment which incorporates a flexible internal ring gear to effect the driving connection between two dial connected spur gears. Both spur gears in this first embodiment are of the same pitch diameter but have differing numbers of gear teeth. In one preferred structure of the first embodiment, the Imperial measure dial connected gear has 127 teeth on an approximately two inch pitch diameter gear and the Metric dial connected gear has 120 teeth on a gear of the same pitch diameter. The flexible internal ring gear of approximately 2 ½ inches diameter forms the driving connection between the two gears of differing gear tooth configuration. Because the internal gear is flexible, it may be formed into a cardioid or heart-shaped configuration with the flat section of the flexible belt drivingly engaged with the two different gears. Consequently, there is nearly a tangential relationship between the flexible belt and the spur gears at the point where the teeth of the gears mesh and only a minimal number of gear teeth, as for example 3 or 4 gear teeth of each spur gear, are simultaneously engaged with the flexible belt. Because of this minimal gear teeth contact, there is very little interference and wear of the ring gear even though it meshes with spur gear teeth of differing configurations (the differing configurations being dictated by the different number of teeth of the two gears on the same pitch diameter).

In this first embodiment the flexible ring gear is made from nylon so that it operates very smoothly as the driving connection between two gears of different tooth configurations. This flexible ring gear is also very inexpensive to manufacture and therefore to replace when worn. It also has the advantage of eliminating backlash as a consequence of being spring biased into engagement with the spur gears of the dial assembly.

These and other advantages of this invention will be more readily apparent from the following detailed description of the drawings in which:

FIG. 3 is an exploded perspective view of the dials and connecting gearing of the dial assembly of FIG. 1.

FIG. 3a is a perspective view of the gearing arrangement of the dial assembly of FIG. 1.

FIG. 4 is a cross sectional view taken on line 4—4 of FIG. 2.

FIG. 5 is a cross sectional view taken on line 5—5 of FIG. 2.

FIG. 6 is a side elevational of a second embodiment of a dial assembly and connected lead screw incorporating the invention of this application.

FIG. 7 is a longitudinal cross sectional view of the dial assembly of FIG. 6, and taken on line 7—7 of FIG. 6.

FIG. 8 is a cross sectional view taken on line 8—8 of FIG. 7.

Figure 1:
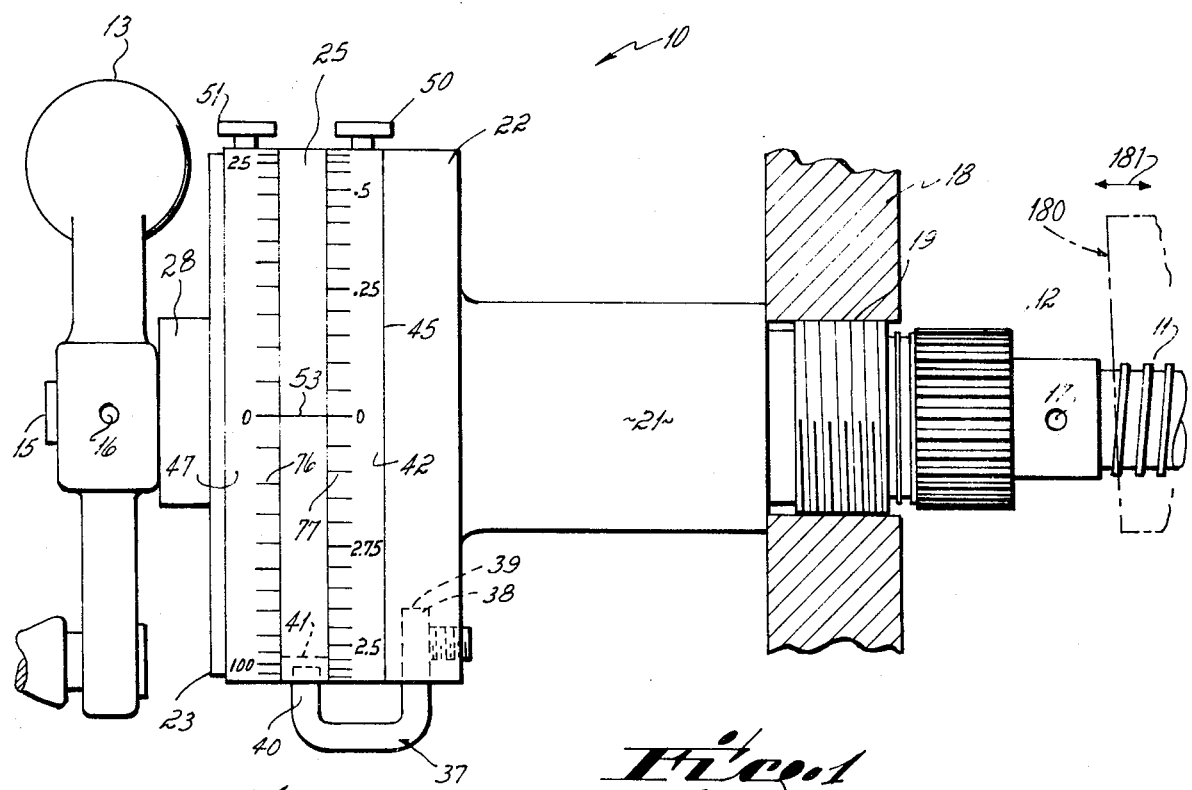
FIG. 1 is a side elevational view of a first embodiment of a dial assembly and connected lead screw incorporating the invention of this application.
Figure 2:
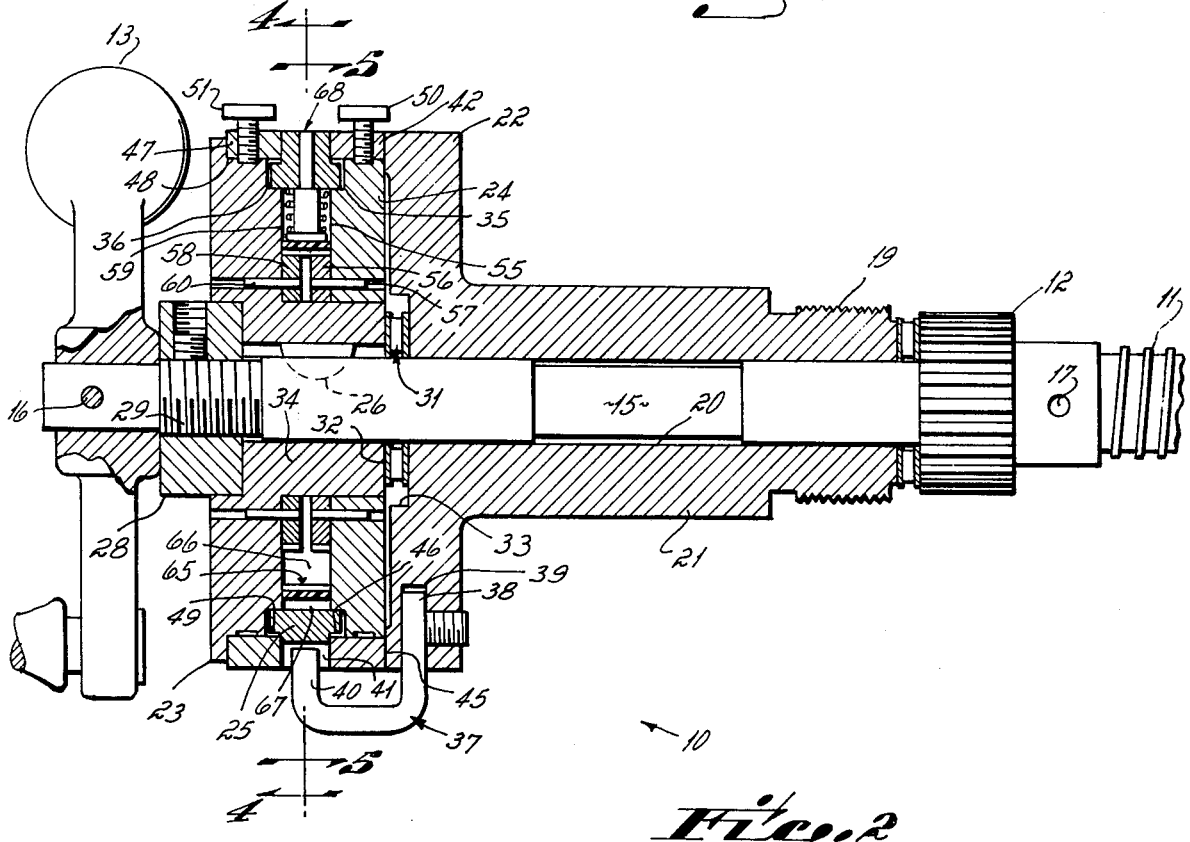
FIG. 2 is a longitudinal cross sectional view of the dial assembly of FIG. 1.

Referring first to FIGS. 1 and 2, there is illustrated a first embodiment of a dial assembly 10 for measuring the displacement of a slide (shown diagrammatically at 180) driven in linear fashion (note arrow 181) from a lead screw 11. The lead screw 11 is drivingly keyed to or formed integral with a main shaft 15 which may be driven in rotation either by a lead screw connected gear 12 or by a hand grip crank 13. Both the gear 12 and hand grip crank 13 are keyed to the shaft as by drive pins 16, 17.

The main shaft 15 is mounted within and extends through a central bore 20 of a supporting hub 21. The hub is fixedly mounted within a frame element, as for example a cross feed mounting slide 18, by being threaded therein as illustrated at 19. While the invention is illustrated and described herein as being applied to a cross feed drive shaft of a lathe it is equally adaptable to use on any machine tool or movable slide of a machine. The lead screw 11, main shaft 15, and supporting hub 21 and frame element 18, thus cooperate to translate rotary motion (as imparted to main shaft 15 by gear 12 or crank 13) into linear motion of the slide 180, thereby providing a rotary-to-linear motion translating device.

The dial assembly 10 of this invention includes a base plate 22, a sleeve 23, a hub 24 and stationary ring 25. In the first embodiment, the base plate 22 of the dial assembly is integrally formed on the outer end of the supporting hub 21. Sleeve 23 is fitted over the main shaft 15 and keyed to it as by a Woodruff key 26. It is secured onto the outer end of the main shaft 15 by a nut 28 threaded over a threaded section 29 of the main shaft 15. Preferably a needle bearing assembly 31 is sandwiched between the inner end 32 of the sleeve 23 and a counterbored recess 33 in the end face of the base plate 22.

The hub 24 is rotatably mounted upon the central hub section 34 of the sleeve 23. Both the hub 24 and the sleeve 23 have a shoulder 35, 36 respectively formed on their opposite faces so as to accommodate and support a stationary ring 25. This ring 25 is restrained against rotation by a locking rod 37, one end 38 of which is secured within a recess 39 of the base plate 22 and the opposite end 40 of which fits within a slot or keyway 41 in the periphery of the ring. The locking rod thus insures that the ring 25 is restrained against rotational movement.

An indicia bearing dial 42 is rotatably mounted upon the periphery of the hub 24. This dial, demarked in Metric units of measure, is supported between the end face 45 of base plate 22 and a shoulder 46 on the inner face of the ring 25. A second dial 47, demarked in Imperial or English units of measure, is rotatably mounted upon the periphery of the sleeve 23. This dial is supported between a shoulder 48 of the sleeve and an opposing shoulder 49 on the outer face of the stationary ring 25. Both dials 42, 47 have a set screw 50, 51 extending therethrough which enables them to be adjusted to a zeroing position relative to a datum or reference line 53 on the stationary ring 25 and then secured to the hub 24 and sleeve 23 respectively by the set screws 50, 51.

Secured to the outer face 55 of the hub 24 there is a spur gear 56. This gear is pinned to the face of the hub as by locking pins 57. Similarly, there is a spur gear 58 secured to the inner face 59 of the sleeve 23. This gear is also secured onto the sleeve by locking pins 60. The two spur gears 56 and 58 are of exactly the same pitch diameter but have differing numbers of gear teeth formed on the periphery. In the illustrated first embodiment the spur gear 56 which is attaching to the hub 24 has 120 teeth formed on its periphery while the spur gear 58 has 127 teeth formed on its periphery. The two spur gears 56, 58 are drivingly interconnected by an internally toothed ring gear or ring belt 65. In this first embodiment, the ring gear is made of a flexible material such that it may take a non-circular configuration while still maintaining a driving relationship between the two spur gears 56, 58. One suitable flexible material from which the ring gear may be made is nylon. The ring 65 is forced into a non-circular configuration by confinement within the chamber 66 formed by the inner surface of the stationary ring 25 and the faces 55, 59 of the hub 24 and sleeve 23 respectively. The distance between the point of contact 64 of the flexible internal gear 65 and the spur gears 56, 58 and the opposite internal side 67 of the chamber 66 is less than the diameter of the flexible gear 65 with the result that the flexible gear 65 is forced to take a cardioid configuration. At the top or flat point 64 of the flexible gear 65 it extends nearly tangentially to the two spur gears 56, 58. Because of this nearly tangential relationship between the flexible gear 65 and the gears 56, 58 only a very minimal number of gear teeth on the flexible belt are simultaneously in driving engagement with the teeth 56a of the gear 56 or the teeth 58a of the gear 58. This minimal tooth contact between the dissimilar gear teeth 56a, 58a minimizes wear of the teeth 65a of the belt.

To maintain the flexible belt 65 in driving engagement with the teeth 56a and 58a of the gears 56, 58, and at the same time eliminate backlash from the gears, a guide pin 68 is mounted within the stationary ring 25. This guide pin has a large head 69 on one end, a large diameter body section 70 and a small diameter end section 71. The small diameter end section 71 is slidable within a bore 72 of the ring 25. There is a compression spring 73 mounted between the inner end of the head 69 of the pin and the inner peripheral surface 74 of the ring 25. This spring 73 biases the pin inwardly so as to force the teeth of the flexible belt 65 into backlash free engagement with the teeth of the gears and into a non-circular or flattened condition. The large diameter body section 70, is of such a length, that it prevents the gears 56 and 58 to get out of mesh with flexible gear 65.

In this first embodiment the two gears 56, 58 each have a pitch diameter of approximately two inches. The gear 58 has 127 teeth and the gear 56 has 120 teeth. The flexible internal gear 65 is molded and has a pitch diameter of approximately 2 ¼ inches and 156 teeth. The teeth of the internal ring gear are shaped so as to mate with the 127 teeth of the gear 58 and with the 120 teeth of the same pitch diameter gear 56. When assembled into the dial assembly 10 the flexible gear 65 is forced into its non-circular or cardioid configuration by the pin 68 and spring 73.

In operation, upon rotation of the hand grip crank 13 or of the gear 12, the main shaft 15 is caused to rotate. This rotational movement imparts rotation to the sleeve 23 and the Imperial measure dial 47 drivingly secured to the sleeve by the set screw 51. The dial 47 is demarked as illustrated by the indicia 76 in units of measure which correspond to 125 equal divisions and the lead screw 11 is threaded with a thread of eight threads per inch. Consequently, each revolution of the hand grip 13 effects one rotation of the shaft 15 and one revolution of the dial 47. Simultaneously with each revolution of the sleeve 23 and dial 47, the gear 58 moves through one full revolution and in so doing causes the interconnected gear 56 to move through more than one revolution because of the driving connection between the teeth of the dial 58, the flexible gear 65 and the teeth of the gear 56. Specifically, in one full revolution of the gear 58, the gear 65 causes the gear 56 to move 127 gear teeth past a fixed point, or otherwise expressed to move 127/120 revolutions. The dial 42 attached to the hub 24 thus is caused to move the same 127/120 revolutions per revolution of the hand grip 13. The dial 42 is demarked in 300 indicia 77, demarking three millimeters of axial movement for each full revolution of the dial 42, but since the dial 42 measures 3.175 millimeters of movement (127/120 × 3) per revolution of the hand crank, the dial 42 accurately reflects axial movements effected by the ⅛ inch (3,175 millimeters) pitch of the lead screw 11 and always remains continuing for continuous rotations of the handwheel or drive shaft 15.

The primary advantage of using a flexible internal gear as the driving connection between the two spur gears 56, 58 resides in the flexible gear's capability of being formed into a generally non-circular cardioid configuration. This capability enables the dial assembly 10 to be made into a much smaller package than is the case if a solid non-flexible internal gear is used in lieu of the flexible gear. Employment of the flexible gear also has the advantage of being an inexpensive gear which is easily replaced when worn and of having a very smooth backlash free operating A second embodiment of a dial assembly 100 in accord with the principles of this invention is illustrated in FIGS. 6-8. As shown in FIG. 6, the dial assembly 100 cooperates with a lead screw 101 that is drivingly keyed with a main shaft 102 through a splined sleeve 103 assembly. The main shaft 102 may be rotated either by drive gear 104 on the splined sleeve 103, or by hand grip crank 105 fixed to shaft 102 by pin 106. The internally splined sleeve 103 connects externally splined shaft end 10 of the lead screw 101 with externally splined shaft end 108 of the main shaft 102. The main shaft 102 is mounted within and extends through a central bore of a supporting hub 109, that hub 109 being fixedly mounted within a frame element 110 by being threaded therein as at 111. The supporting hub 109 cooperates with bearings 112 to support the main shaft 102 and lead screw 101 in rotational relation relative to the frame element 110. The frame element 110 may be, e.g., a cross-feed mounting slide for a lathe, as was the case with the frame element 18 for the first embodiment of the dial assembly 10.

The dial assembly 100 of this second embodiment, as with the first embodiment, includes a base plate 115, a first scale plate 116, a second scale plate 117, and a stationary ring 118, see FIG. 7. The base plate 115 is integrally formed on the outer end of the supporting hub 109. The first scale plate's tubular portion 119 is fitted over the main shaft 102 and keyed to it as by a Woodruff key 120, thereby fixing the first scale plate 116 against rotational motion on the main shaft 102. The first scale plate 116 is also secured onto the outer end of the main shaft, i.e., is abutted against base plate 115, by nut threaded over the threaded section of the main shaft, thereby also fixing the first scale plate 116 against longitudinal motion on the main shaft 102. The second scale plate 117 is rotatably mounted upon the first scale plate's tubular portion 119, same being structurally positioned between the first scale plate 116 and base plate 115 in assembly. Both the first 116 and second 117 scale plates have shoulder 121, 122, respectively formed in opposed faces so as to accommodate and support the stationary ring 118 therebetween adjacent the outer periphery of those plates 116, 117. This ring 118 is restrained against rotation by a locking rod 123, one end 124 of which is held within recess 125 of the base plate 115 by set screw 126, and the other end 127 of which fits within keyway 128 in the ring's periphery. The locking rod 123 thus insures that the ring 118 is restrained against rotational movement relative to the main shaft 102.

A first indicia bearing dial 130, demarked in Imperial or English units of measure, is rotatably mounted upon the periphery of the first scale plate 116. This first dial 130 is supported on opposing shoulder 131, 132 of that plate 116 and of the stationary ring 118, respectively. A second indicia bearing dial 133 is rotatably mounted on the periphery of the second scale plate 117. This second dial 133, marked in metric units of measure, is supported between the base plate's free end face 134 and shoulder 135 on the inner face of the ring 118. Both the first 130 and second 133 dials have a set screw 136, 137, respectively, extending therethrough which enables each to be adjusted to a zeroing position relative to reference line 138 on the stationary ring 118. The dials 130, 133 are secured in place to the first 116 and second 117 scale plates, respectively, by the set screws 136, 137.

A first spur gear 140 is secured to inside face 141 of the first scale plate 116, this gear being pinned to that plate by locking pins 142, see FIGS. 7 and 8. Similarly, a second spur gear 143 is secured to the inside face 144 of the second scale plate 117, this gear also being secured to that plate by locking pins 145. The two spur gears are of differing pitch diameters, and have differing numbers of gear teeth on the periphery of each. As illustrated in FIGS. 7 and 8, the first spur gear 140 is of a greater pitch diameter than the second spur gear 143. However, and as illustrated in the first embodiment, the first spur gear 140 (which is attached to the first scale plate 116) has 127 teeth formed on its periphery while the second spur gear 143 (which is attached to the second scale plate 117) has 120 teeth formed on its periphery. The spur gears 140, 143 are mounted to the first 116 and second 117 scale plates, respectively on spaced or different rotational axes 150, 151, i.e., same are not coaxially disposed one to the other when in structural assembly within this second embodiment of the dial assembly 100. Specifically, the first spur gear 140 (which is concentric with first scale 130) is fixed to first scale plate 116 on an axis 150 that is coaxial with the axis of main shaft 102. However, the second spur gear 143 (which is concentric with second scale 133) is fixed to second scale plate 117 on an axis 151 which is slightly offset from the first spur gear's axis 150, i.e., which is eccentric relative to the main shaft's axis.

The two spur gears 140, 143 are drivingly interconnected by a rigid internally toothed ring gear 152. In other words, and in this second embodiment, the rotatable ring gear 152 can be made of a nonflexible material such as steel or the like so that same retains a circular configuration while maintaining a driving relationship to the spur gears 140, 143. The width of the ring gear 152, as with the width of the flexible ring gear 65 in the first embodiment, is such as to drivingly engage the adjacent first 140 and second 143 spur gears at the same time. Note that the ring gear 152 defines yet a third axis 153 in this second embodiment, same also being noncoaxially oriented with the axis of the main shaft 102 (and, also, noncoaxially oriented with both axes 150, 151 of the spur gears), i.e., eccentrically carried relative to both spur gears 140, 143. The rotatable rigid ring gear 152 itself is of a diameter less than the inside diameter of the stationary ring 118 so that same does not contact the inside periphery of that stationary ring during operation of this second embodiment of the dial assembly 100.

A spring 155 loaded guide pin 156 is mounted within the stationary ring 118 to bear upon the rigid ring gear 152 for maintaining same in driving engagement with the teeth of the first 140 and second 143 spur gears at all times. The guide pin 156 includes a large head 157 on one end, a large diameter body section 158, and a small diameter end section 159. The pin's small diameter end section 159 is slidable within bore 160 of the stationary ring 18. The compression spring 155 is carried between the pin's head 157 and the inner peripheral surface of ring 118. The compression spring 155 continuously biases the pin 156 inwardly so as to force teeth of the rigid ring gear 152 into backlash free engagement with the teeth of the respective first 140 and second 143 spur gears during operation of the dial assembly 100. The large diameter body section 158, is of such a length, that it prevents the gears 140 and 143 to get out of mesh with ring gear 152.

In this second embodiment of the dial assembly 100, first spur gear 140 has a pitch diameter of 1.9844" and the second spur gear 143 has a pitch diameter of 1.875". The first spur gear 140 has 127 teeth and the second spur gear 143 has 120 teeth. The rigid internal gear 152 has a pitch diameter of 2.250" and 144 teeth. The teeth of the internal ring gear 152 are shaped so as to mate with the 127 teeth of the first spur gear 140, and with the 120 teeth of the second spur gear 143. The second spur gear's axis 151 is offset from the first spur gear's axis a distance of about 0.0547".

In use of the second embodiment of the dial assembly 100, and upon rotation of the hand grip crank 105 or of the drive gear 104, the main shaft 102 is caused to rotate. This rotational movement imparts rotation to the first dial plate 116 and the Imperial measure dial 130 fixedly secured thereto by set screw 136. Simultaneously, and with each revolution of the first dial plate 116 and dial 130, the first spur gear 140 moves through one full revolution and, in so doing, causes the interconnected second spur gear 143 to move through more than one revolution because of the driving connection between the teeth of the dials 140, 143 through the rigid inner ring gear 152. Thus, the Metric dial 133 is caused to move slightly more than one revolution per each revolution of the hand grip. The relation of the Imperial 130 and Metric 133 dials in use is as discussed earlier in connection with the first embodiment of the dial assembly 10 of this invention. Under certain operational conditions, use of a rigid internal ring gear 152 as the driving connection between the first 140 and second 143 spur gears may reduce maintenance requirements for the dial assembly 100 unit. More specifically, the rigid ring gear 152 is not likely to have the teeth stripped therefrom during use, nor is same likely to have the internal teeth thereon wear down during use, as might occur in extended or particularly heavy use of the flexible ring gear 65 discussed in connection with the first embodiment of the dial assembly 10 of this invention.

While I have described only the preferred embodiments of my invention, persons skilled in the art to which it pertains will readily appreciate changes and modifications which may be made in the invention. Specifically, those persons will readily appreciate that the ratio of gear teeth will change with the change in pitch of the lead screw driven from the gear. Additionally, persons skilled in the art to which the invention pertains will readily appreciate that the invention is applicable to any rotary shaft which operates to drive a slide or movable element in uniform linear motion whether by means of a screw and nut, rack and pinion or any other conventional rotary to linear motion translating mechanism. Furthermore, persons skilled in the art will appreciate that a non-flexible ring or belt may be substituted for the flexible belt and a flexible ring or belt may be substituted for a non-flexible ring or belt and that both flexible and non-flexible rings may be spring biased into engagement with the teeth of the spur gears to make the device backlash free. As used in the claims the term "belt" is intended to be generic and to describe belts or rings which have gear teeth, protrusions or other drive elements formed thereon and cooperable with the teeth of the spur gears to form a driving connection therebetween. Accordingly, I do not intend to be limited except by the scope of the following appended claims.

Having described my invention, I claim:

1. A dial assembly for use in combination with a rotary-to-linear motion translating device to measure, in two different sets of units, movements of an element effected by said motion translating device, said assembly comprising,
    a rotatable shaft adapted to be secured to said motion translating device,
    a first scale means mounted upon said shaft and having a direct driving connection with said shaft, said first scale means having unit indicia thereon which is continuing when the first scale means moves through more than one complete revolution,
    a second scale means mounted for rotation relative to said shaft, said second scale means having unit indicia thereon which is continuing when the second scale means moves through more than one complete revolution, the unit indicia of said second scale means being demarked in a different unit of measure from the unit indicia of said first scale,
    gear train means mechanically interconnecting said first scale means to said second scale means, said gear train means including a pair of spur gears, said spur gears having different numbers of teeth and being drivingly connected to said first and second scale means, and
    a continuous toothed belt drivingly interconnecting continuous internally toothed belt maintained in driving interconnected relation with said pair of spur gears.

2. The gear assembly of claim 1 in which said spur gears are both of the same pitch diameter but have differing numbers of gear teeth.

3. The gear assembly of claim 1 in which said toothed belt is flexible and is non-circular within said gear assembly.

4. The gear assembly of claim 1 in which the unit indicia of one of said scale means demark English units of measure and the unit indicia of the other scale means demark Metric units of measure.

5. The gear assembly of claim 1 in which said toothed belt has teeth formed on the inner peripheral surface, the teeth of said belt being spring biased into engagement with the teeth of said spur gears.

6. The gear assembly of claim 1 in which said spur gears are of different pitch diameters and have different numbers of gear teeth.

7. The gear assembly of claim 1 in which said toothed belt is structurally rigid.

8. The gear assembly of claim 7 in which said spur gears are axially offset relative one to the other, that offset permitting said rigid toothed belt to be of a single pitch diameter.

9. A dial assembly for use in combination with a rotary-to-linear motion translating device of a machine to measure in two different sets of units movement of a machine element effected by said motion translating device, said assembly comprising,
    a body adapted to be mounted upon the machine,
    a shaft mounted within the body and adapted to be operatively connected to said motion translating device,
    a first scale means mounted upon and drivingly keyed to said shaft,
    a second scale means rotatably mounted relative to said first scale means,
    said first and second scale means each having unit indicia thereon which is continuing when said first and second scale means move through more than one revolution, said unit indicia of said first scale means being demarked in different units of measure from this unit indicia of said second scale means, and
    gear train means drivingly interconnecting said first scale means and second scale means, said gear train means including a pair of spur gears, said spur gears having different numbers of teeth and being connected by a continuous internally toothed belt, said belt having teeth maintained in engagement with the teeth of both said spur gears such that one of said spur gears is operative to drive the belt and the other spur gear is driven from the belt.

10. The gear assembly of claim 9 in which said spur gears are both of the same pitch diameter but have differing numbers of gear teeth.

11. The gear assembly of claim 9 in which said toothed belt is flexible with non-circular within said gear assembly.

12. The gear assembly of claim 9 in which the unit indicia of one of said scale means demark English units of measure and the unit indicia of the other scale means demark Metric units of measure.

13. The gear assembly of claim 9 in which said teeth of said toothed belt are located on the inner peripheral surface, the teeth of said belt being spring biased into engagement with the teeth of said spur gears.

14. The gear assembly of claim 9 in which said spur gears are of different pitch diameters and have different numbers of gear teeth.

15. The gear assembly of claim 9 in which said toothed belt is structurally rigid.

16. The gear assembly of claim 15 in which said spur gears are axially offset relative one to the other, that offset permitting said rigid toothed belt to be of a single pitch diameter.

17. The dial assembly of claim 9 in which said first scale means includes a sleeve drivingly keyed to said shaft and a first dial adjustably mounted upon said sleeve, the unit indicia of said first scale means being demarked upon said first dial.

18. The dial assembly of claim 17 in which said second scale means includes a hub rotatably mounted upon said sleeve and a second dial adjustably mounted upon said hub, the unit indicia of said second scale means being demarked upon said second dial.

19. The dial assembly of claim 18 which further includes a stationary ring mounted between said sleeve and said hub, said stationary ring having a datum reference line demarked thereon.

20. The dial assembly of claim 19 in which one of said spur gears is fixedly secured to said sleeve and the other spur gear is fixedly secured to said hub.

21. The gear assembly of claim 20 in which said spur gears are both of the same pitch diameter but have differing numbers of gear teeth.

22. The gear assembly of claim 21 in which said toothed belt is flexible and non-circular, the teeth of said toothed belt being spring biased into engagement with the teeth of said spur gears.

23. The gear assembly of claim 22 in which the unit indicia of one of said scale means demark English units of measure and the unit indicia of the other scale means demark Metric units of measure.

24. The gear assembly of claim 20 in which said spur gears are different pitch diameters and have different numbers of gear teeth.

25. The gear assembly of claim 24 in which said toothed belt is structurally rigid.

26. The gear assembly of claim 25 in which said spur gears are axially offset relative one to the other, that offset permitting said rigid toothed belt to be of a single pitch diameter.

* * * * *

UNITED STATES PATENT AND TRADEMARK OFFICE
CERTIFICATE OF CORRECTION

PATENT NO. : 4,058,080
DATED : November 15, 1977
INVENTOR(S) : Otto Hermann

It is certified that error appears in the above-identified patent and that said Letters Patent are hereby corrected as shown below:

Column 4, line 58, "attaching" should be -- attached --

Column 6, line 4, "(3,175 millimeters)" should be -- (3.175 millimeters) --

Column 6, line 17, after "operating," insert -- characteristic --

Column 6, line 27, "10" should be -- 107 --.

Column 8, line 5, "18" should be -- 118 --

Column 9, line 39, delete "a continuous toothed belt drivingly interconnecting"

Column 9, line 40, insert at beginning of line -- a --

Column 10, line 25, after "both," insert -- of --

Signed and Sealed this

Fourth Day of April 1978

[SEAL]

Attest:

RUTH C. MASON
Attesting Officer

LUTRELLE F. PARKER
Acting Commissioner of Patents and Trademarks